United States Patent [19]
Weldon

[11] Patent Number: 5,530,309
[45] Date of Patent: Jun. 25, 1996

[54] HOMOPOLAR MACHINE

[75] Inventor: William F. Weldon, Austin, Tex.

[73] Assignee: Board of Regents, The University of Texas System, Austin, Tex.

[21] Appl. No.: 58,091

[22] Filed: May 4, 1993

[51] Int. Cl.⁶ .................................................. H02K 31/00
[52] U.S. Cl. ........................... 310/178; 310/237; 310/248
[58] Field of Search ..................................... 310/178, 127, 310/148, 237, 243, 248, 254, 261, 184, 208; 322/48

[56] References Cited

U.S. PATENT DOCUMENTS

| | | | |
|---|---|---|---|
| 3,882,366 | 5/1975 | Clunis | 310/178 |
| 4,119,875 | 10/1978 | Noguchi | 310/248 |
| 4,246,507 | 5/1981 | Weldon et al. | |
| 4,320,318 | 3/1982 | Weldon | |
| 4,459,504 | 7/1984 | Weldon et al. | |
| 4,503,349 | 3/1985 | Miller | 310/178 |
| 4,521,709 | 6/1985 | Saint-Michel | 310/178 |
| 4,544,874 | 10/1985 | Weldon et al. | |
| 4,562,368 | 12/1985 | Weldon et al. | |
| 4,800,311 | 1/1989 | Weldon et al. | |
| 4,816,709 | 3/1989 | Weldon | |
| 4,888,511 | 12/1989 | Aoki | 310/237 |

OTHER PUBLICATIONS

G. H. Gully et al. "Compact Homopolar Generator Development CEM-UT", 2nd IEEE Symposium on Electromag. Launch, Technol; Boston, Mass, Oct. 1983.

J. E. Floyd et al. "A New High Current Lab. and Pulsed Homopolar Generator PWR Supply at Univ. of Texas", 2nd IEEE Symposium of Electmag. Launch Techn. Boston, Mass., Oct. 1983.

Tom M. Bullion, "5-Megajoule Homopolar Upgrade," presented at the Third IEEE International Pulsed Power Conference, Albuquerque, New Mexico, Jun. 1981.

W. A. Walls and E. G. Estes, "Continued Development of High Energy Density, Higher Current Rated Homopolar Generators at CEM-UT," presented at the Fourth IEEE International Pulsed Power Conference, Albuquerque, New Mexico, Jun., 1983.

H. H. Woodson et al., "Pulsed Power from Inertial Storage with Homopolar Machines for Conversion," presented at the IEEE International Pulsed Power Conference, Lubbock, Texas, Nov. 1976.

W. F. Weldon, et al., "The Design, Fabrication, and Testing of a Five Megajoule Homopolar Motor-Generator," presented at the International Conference on Energy Storage, Compression and Switching, Torino, Italy, Nov., 1974.

M. Brennan et al., "Test Data on Electrical Contacts at High Surface Velocities and High Current Densities for Homopolar Generators," presented at the Seventh Symposium on Engineering Problems of Fusion Research, Knoxville, Tennessee, Oct. 1977.

J. H. Gully et al., "Design of a Compact, Light Weight Pulsed Homopolar Generator Power Supply," presented at the Third IEEE International Pulsed Power Conference, Albuquerque, New Mexico, Jun., 1981.

Michael Brennan, "The Experimental Investigation of the Effects of Contact Area and Large Currents on Sliding Electrical Contacts," thesis presented to the faculty of the Graduate School of the University of Texas at Austin in partial fulfillment of requirements for the degree of Master of Science and Engineering, May, 1979.

(List continued on next page.)

*Primary Examiner*—R. Skudy
*Attorney, Agent, or Firm*—Arnold, White & Durkee

[57] ABSTRACT

An improved homopolar machine in which a solid sliding current collector, or brush, is provided for contact with a flat, annular contact surface of a rotor. The flat plane of the contact surface is orthogonal to the rotor's axis of rotation. A plurality of such contact surfaces with corresponding brushes may be employed. Also, several means for actuating the brush into contact with the rotor contact surface are provided.

39 Claims, 4 Drawing Sheets

OTHER PUBLICATIONS

W. L. Bird et al., "The Design of a Pulsed Homopolar Generator Power Supply for a High Current Laboratory," presented at the 4th IEEE International Pulsed Power Conference, Albuquerque, New Mexico, Jun., 1983.

K. M. Tolk, et al., "Inertial Energy Storage Research at the University of Texas at Austin," presented at the IEEE International Pulsed Power Conference, Lubbock, Texas, Nov. 1976.

W. L. Bird, et al., "Preliminary Engineering Design of a Pulsed Homopolar Generator Power Supply," presented at the IEEE International Pulsed Power Conference, Lubbock, Texas, Nov., 1976.

K. I. Thomassen, et al., "Pulsed Energy Storage in Fusion Devices," presented at the Sixth IAEA Conference, Germany, Oct. 1976.

H. F. Vogel, et al., "Energy Storage and Transfer with Homopolar Machine for a Linear Theta–Pinch Hybrid Reactor," presented at the Ninth Symposium on Fusion Technology, Germany, Jun. 1976.

W. F. Weldon, et al., "The Design of Homopolar Motor–Generators for Pulsed Power Applications," presented at the Sixth Symposium on Engineering Problems of Fusion Research, San Diego, California, Nov., 1975.

J. H. Gully, et al., "One Millisecond Discharge Time Homopolar Machine (FDX)," presented at the IEEE International Pulsed Power Conference, Lubbock, Texas, Nov., 1976.

W. L. Bird, "System Engineering and Design of a Pulsed Homopolar Generator Power Supply for the Texas Experimental Tokamak," presented at the Seventh Symposium on Engineering Problems of Fusion Research, Knoxville, Tennessee, Oct., 1977.

W. F. Weldon, "Pulsed Homopolar Generator Research at the University of Texas at Austin," presented at the Generators and Motors Seminar, Wright–Patterson Air Force Base, Ohio, Oct., 1977.

C. H. Ramage, "An Investigation of the Tribological Properties of Graphite Fiber–Metal Matrix Composites," dissertation, presented to the faculty of the Graduate School of The University of Texas at Austin in partial fulfillment of requirements for the degree of Doctor of Philosophy, Dec., 1977.

M. J. Bharucha, "Testing and Evaluation of Brushes Used for the Fast Discharge Homopolar Generator Through the Use of the Controlled Atmosphere Brush–Testing Facility," thesis, presented to the faculty of the Graduate School of The University of Texas at Austin, in partial fulfillment of reqirements for the degree of Master of Science in Engineering, Dec., 1978.

J. M. Weldon, "Design, Construction, and Evaluation of a High Speed Controlled Atmosphere Brush Test System," thesis, presented to the faculty of the Graduate School of The University of Texas at Austin, in partial fulfillment of requirements for the degree of Master of Science in Engineering, Aug., 1976.

H. G. Rylander, et al., "Homopolar Motor–Generator for Inexpensive Inertial Energy Storage," *Texas Atomic Energy Research Foundation Project Progress Report No. 21*, Apr. 1974.

H. G. Rylander and H. H. Woodson, "Homopolar Motor–Generator Inertial Energy Storage Systems," presented at the DCTR Power Supply and Energy Storage Review Meeting, Germantown, Maryland, Mar. 1974.

H. G. Rylander, et al., "Homopolar Motor–Generator for Inexpensive Inertial Energy Storage," *Texas Atomic Energy Research Foundation Project Progress Report No. 20*, Oct. 1973.

H. G. Rylander, et al., "Investigation of the Homopolar Motor–Generator as a Power Supply for Controlled Fusion Experiments," presented at the Fifth Symposium on Engineering Problems of Fusion Research, Princeton, New Jersey, Nov., 1973.

H. G. Rylander, et al., "Homopolar Motor–Generator for Inexpensive Inertial Energy Storage," *Texas Atomic Energy Research Foundation Project Progress Report No. 19*, Apr. 1973.

R. E. Rowberg, et al., "Characteristics of a Homopolar Machine as a Power Supply for Large Pulsed Magnetic Fields for Fusion Experiments," presented at the 25th Annual Southwestern IEEE Conference & Exhibition, Houston, Texas, Apr., 1973.

H. G. Rylander, et al., "Homopolar Motor–Generator Designs for Cheap Inertial Energy Storage," presented at the Conference on Technology of Controlled Thermonuclear Fusion Experiments and the Engineering Aspects of Fusion Reactors, Austin, Texas, Nov., 1972.

J. E. Everett, et al., "Development and Testing of Experimental Materials and Designs for Pulsed and Continuous Duty High Current, High Slip Speed, Generator Contacts," presented at the IEEE Holm Conference on Electrical Contacts, Sep., 1987.

W. L. Noble, et al., "Final Manufacture and Assembly of a Modular 60 Megajoule Pulsed Homopolar Power Supply," presented at the 3rd Symposium on Electromagnetic Launch Technology, Austin, Texas, Apr., 1986.

W. A. Walls, et al., "Improved Energy Density Homopolar Generator," presented at the 3rd Symposium on Electromagnetic Launch Technology, Austin, Texas, Apr., 1986.

R. C. Zowarka, Jr., et al., "Testing of a Homopolar Generator, Energy Storage Inductor, Opening–Switch Railgun System," presented at the 3rd Symposium on Electromagnetic Launch Technology, Austin, Texas, Apr., 1986.

D. E. Perkins, et al., "Self Excitation of Iron Core Homopolar Generators," presented at the 3rd Symposium on Electromagnetic Launch Technology, Austin, Texas, Apr., 1986.

J. H. Price, et al., "The High Voltage Homopolar Generator," presented at the 3rd Symposium on Electromagnetic Launch Technology, Austin, Texas, Apr. 1986.

W. A. Walls, et al., "Systems Tester for Compact Homopolar Generator Component Development," presented at the 2nd IEEE Symposium on Electromagnetic Launch Technology, Boston, Massachusetts, Oct., 1983.

W. F. Weldon and T. Aanstoos, "The Proposed CEM–UT 50 MJ Pulsed Homopolar Generator Power Supply," *IEEE Transactions on Magnetics*, vol. MAG–18, No. 1, pp. 165–169 (Jan., 1982).

J. H. Gully, "ARRADCOM/DARPA Compact Homopolar Generator," *IEEE Transactions on Magnetics*, vol. MAG–18, No. 1, pp. 160–164 (Jan., 1982).

R. A. Marshall and W. F. Weldon, "Parameter Selection for Homopolar Generators Used as Pulsed Energy Stores," *Electric Machines and Electromechanics*, vol. 6, pp. 109–127 (1981).

W. A. Walls, et al., "Design of a Homopolar Generator Power Supply System for the Ignitex Experiment," presented at the 13th Symposium on Fusion Engineering, Knoxville, Tennessee, Oct., 1989.

M. D. Werst, et al., "Homopolar Generator Powered High Field Magnet Experiment for the Ignitex Fusion Devise," presented at the Seventh IEEE Pulsed Power Conference, Monterrey, California, Jun., 1989.

J. R. Kitzmiller, et al., "Testing the 60 MJ Pulsed Homopolar Power Supply at the University of Texas, Center for Electromechanics," presented at the Seventh IEEE Pulsed Power Conference, Monterrey, California, Jun., 1989.

J. M. Weldon, et al., "Startup Tests and Commissioning of a 60 MJ Pulsed Power Supply," presented at the 1987 Pulsed Power Conference, Washington D, C., Jun., 1987.

J. H. Gully, "Rebuilding the Five Megajoule Homopolar Machine at the University of Texas," presented at the 2nd IEEE International Pulsed Power Conference, Lubbock, Texas, Jun., 1979.

T. M. Bullion, "Testing an Analysis of a Fast Discharge Homopolar Machine (FDX)," presented at the Second IEEE International Pulsed Power Conference, Lubbock, Texas, Jun., 1979.

J. M. Weldon and W. F. Weldon, "The Homopolar Generator as a Pulsed Industrial Power Supply," presented at the Industrial Energy Conservation Technology Conference, Houston, Texas, Apr., 1979.

W. F. Weldon, et al., "FDX—A Fast Discharge Homopolar Generator," presented at the Seminar on Energy Storage, Compression and Switching, Australia, Nov., 1977.

W. F. Weldon, et al., "The Text Energy Storage System," presented at the Seminar on Energy Storage, Compression and Switching, Australia, Nov., 1977.

W. F. Weldon, et al., "Homopolar Generator Development at the University of Texas," presented at the Seminar on Energy Storage, Compression and Switching, Australia, Nov., 1977.

M. D. Driga, et al., "Electromagnetic Torques and Forces Due to Misalignment Effects and Eddy Currents in the Homopolar Generator Power Supply for the Texas Experimental Tokamak (TEXT)," presented at the Seventh Symposium on Engineering Problems of Fusion Research, Knoxville, Tennessee, Oct. 1977.

W. F. Weldon, "Mechanical Energy Storage and Electromechanical Energy Conversion," presented at the Pulsed Power Lecture Series, AF Institute of Technology, Wright–Patterson Air Force Base, Jul., 1980, and AF Weapons Laboratory, Kirtland Air Force Base, Jul., 1980.

D. J. Ortloff, "The Design of a Brush Test Machine and the Verification of the Machine Design and Brush Design under Test Conditions of High Current Densities and High Relative Surface Velocities," thesis, presented to the faculty of the Graduate School of The University of Texas at Austin in partial fulfillment of requirements for the degree of Master of Science in Mechanical Engineering, Jan., 1975.

W. F. Weldon, et al., "Inexpensive Inertial Energy Storage Utilizing Homopolar Motor–Generators," presented at the Energy System Session, Second Annual UMR–MEC Conference on Energy, University of Missouri–Rolla, Oct., 1975.

R. C. Swanson, "The Optimal Control of a Homopolar Motor–Generator Using Electrical Brush Mechanical Load Variation," dissertation, preseneted to the faculty of the Graduate School of The University of Texas at Austin in partial fulfillment of requirements for the degree of Doctor of Philosophy, Dec., 1976.

W. A. Walls, "High Speed, High Current Copper Finger Brushes for Pulsed Homopolar Generator Service," presented at the IEEE Holm Conference on Electrical Contacts, Sep., 1985.

R. A. Marshall, "The Mechanism of Current Transfer in High Current Sliding Contacts," *Wear*, vol. 37, pp. 233–240 (1976).

M. Brennan, et al., "The Testing of Sliding Electrical Contacts for Homopolar Generators," presented at the Twenty-–Fourth Annual Holm Conference on Electrical Contacts, Chicago, Illinois, Nov., 1977.

J. M. Casstevens, "Measurement of the Friction and Wear Characteristics of Copper–Graphite Sliding Electrical Contact Materials at Very High Speeds and Current Densities," thesis, presented to the faculty at the Graduate School of The University of Texas at Austin in partial fulfillment of requirements for the degree of Master of Science of Science in Engineering, Aug., 1976.

H. H. Woodson, et al., "Homopolar Motor–Generator for Inexpensive Inertial Energy Storage," *Texas Atomic Energy Research Foundation Project Progress Report No. 22*, Oct., 1974.

_Fig. 3_

_Fig. 3A_

_Fig. 3B_

_Fig. 3C_

_Fig. 3D_

HOMOPOLAR MACHINE

BACKGROUND OF THE INVENTION

The present invention relates to homopolar machines and more particularly to solid sliding current collectors or brushes for use with homopolar generators and motors.

Homopolar machines have been successfully designed for providing peak electrical current discharges lasting several seconds and producing a peak current level in excess of a million amperes direct current. Such machines generally include a cylindrical rotor of either a drum or disc configuration, mounted on a frame, to be rotated about an axis through the center of the cylinder. A field coil encircling the rotor and connected to an external current supply provides an applied field excitation passing through the rotor. The applied field excitation is usually confined and directed by a ferromagnetic yoke surrounding the field coil and all, or a portion of, the rotor.

A typical homopolar machine discharge is described as follows. The energy storing rotor or flywheel is accelerated to high speed, then the external magnetic field is applied via the excitation coil to create a voltage across the spinning rotor. When full field is reached, an external load is connected across the rotor terminals through sliding contacts or brushes. As current begins to flow through the rotor and load, Lorenz forces decelerate the rotor quickly, accomplishing the conversion of the stored kinetic energy to a single electrical current pulse. Pulse lengths depend upon the characteristics of the external load and are typically from 0.5 to 3.0 seconds in duration.

Although homopolar machines are typically operated in the pulsed mode as described, similar machines may also find application as continuous duty, low voltage, high current generators, or as low speed, high torque motors.

When the homopolar machine rotor is spinning, the free electrons within the rotor experience an electromotive force resulting from their interaction with the applied field excitation. In prior art machines, brushes positioned inside the field coil, or between two halves of the field coil, are then lowered onto a radially outward (circumferential) surface of the spinning rotor to allow a current to flow under the influence of such electromotive force to an external circuit, and then back into the rotor through return conductors and additional brushes at a different location. To complete the electrical circuit, at least two sets of such brushes are required. During the discharge, the interaction of the discharge current and the applied field excitation creates a force which decelerates the rotor until its rotation stops and the discharge ends.

It has been found that extremely high current of short duration pulses may be obtained after using a relatively low power conventional prime mover or a conventional low voltage, low amperage power source to store inertial energy in the rotor by gradually accelerating the rotor up to the desired rotational speed.

In known homopolar generators, the brush mechanisms are subjected to extraordinarily difficult duty. In fact, collection of current by the brushes at the high peripheral speeds attained by the rotor represents the single most demanding task of any pulsed homopolar generator component. The desired pulse current magnitude and amount of stored or pulse energy both affect the brush collector area required to transfer the discharge current from the rotor. A fraction of the stored energy is necessarily lost at the brush/rotor interface in the form of heat, which can be reduced by increasing the collector area.

Performance of homopolar machine brushes is also influenced by two external factors: (1) electrical load characteristics, and (2) the method by which the circuit is closed to initiate a discharge. Resistive loads are distinguished by very fast rise times, as peak current is often reached in less than 30 milliseconds (ms). Time available for the brush to become seated before carrying full current is therefore extremely limited. Inductive loads, on the other hand, slow the rise time considerably, but also extend the current pulse duration as the rotor energy is transferred to the inductor. This longer current pulse can significantly increase brush wear rates because the interface flash temperature, the peak temperature reached at the sliding brush/rotor interface, is maintained for extended periods, thus softening the brush material.

Homopolar machines are typically switched by one of two methods. An external closing switch may be used, or the load may be connected directly to the brushes with switching performed by actuating the brushes into contact with the rotor. If the latter method is chosen, an arc may be drawn as contact is made, causing pitting of the brush surface and corresponding increased wear, thus reducing useful brush life.

The foregoing is provided by way of background only. The general state of the art relating to pulsed power homopolar machines and generators is described more fully in the following publications, which are incorporated herein by reference: U.S. Pat. No. 4,459,504 to W. F. Weldon et al., issued Jul. 10, 1984; U.S. Pat. No. 4,544,874 to W. F. Weldon et al., issued Oct. 1, 1985; U.S. Pat. No. 4,816,709 to Weldon, issued Mar. 28, 1989; W. F. Weldon et al., "The Design, Fabrication, and Testing of a Five Megajoule Homopolar Motor-Generator," presented at the International Conference on Energy Storage, Compression and Switching in Torino, Italy (November 1974); and J. H. Gully, "Compact Homopolar Generator," *IEEE Transactions on Magnetics*, vol. MAG-18, No. 1 (January 1982). In addition, U.S. Pat. No. 4,816,709 to W. F. Weldon, issued Mar. 18, 1989, describes an energy density homopolar generator as well as the general state of the art of homopolar generators.

The successful development of solid sliding current collectors, or brushes, has advanced significantly over the past two decades (reference U.S. Pat. Nos. 4,459,504 and 4,562,368), driven significantly by the requirements of pulsed homopolar machines. The complex brush mechanisms that have resulted represent a significant fraction of the cost of such machines, both in terms of initial manufacturing cost and continuing maintenance and replacement cost. These costs are primarily a function of the multiplicity of parts that result from the following requirements. Specifically, the brushes must:

(1) be retractable from the rotor surface to reduce wear and losses when not generating;

(2) be capable of rapid actuation to enable use as a closing switch;

(3) have a zero backlash mechanism to provide consistent repeatable alignment of the brush wear surface with the rotor or slip ring, as the brush wear rate has been found to be extremely sensitive to proper brush alignment;

(4) have low inertia to follow rotor runout;

(5) be current compensated to increase brush down force with increasing current levels to prevent arcing; and (6) provide sufficient brush length for adequate wear allowance.

Meeting these diverse requirements has resulted in a multiplicity of parts to be manufactured and assembled, or to be disassembled and reassembled in the course of machine maintenance.

The physical constraints of known brush mechanisms reduce their efficiency. For example, the space required for the known brush mechanisms results in only a fraction of the rotor periphery being contacted by brushes. Further the curvature of the brush surface of known brush mechanisms must precisely match that of the rotor under varying conditions of wear, temperature and alignment. Even the smallest mismatch in curvature will result in substantial reduction in effective contact area, increased contact impedance, increased brush wear, and therefore decreased machine performance.

SUMMARY OF THE INVENTION

The problems outlined above are addressed by the device and method of the present invention. The present invention maintains the operating advantages of the known current collection systems described above while reducing the part count, simplifying the manufacture, and reducing the space required by the current collection mechanism and, consequently, reducing the size and cost of the homopolar machine while improving its efficiency.

Prior art brushes are made for contact with the radially outward rotor rim, which is a curved surface. In contrast, the brush of the present invention is designed for contact with a flat contact surface formed on an axial end of the rotor or a ring attached thereto or extending therefrom. Another improvement over the prior art is that the presently contemplated brush mechanism comprises a single brush or brush set per interface, as opposed to multiple independently mounted brushes. This results in the entire swept area of the rotor being contacted by the brush material.

In a preferred embodiment, the one piece face brush mechanism of the present invention comprises an annular metal ring or plate with a suitable current collector material (such as Morganite CM-1S, electroless graphite or sintered copper graphite) attached to it ("brush ring"). Suitable attaching methods include bolting, soldering, brazing, sintering, clamping, or any other method effectively used to attach brush material to a metal ring. Alternatively, the current collector material (brush) may be flexibly mounted by means of a flexible or compliant shunt (such as a diaphragm spring) to help ensure a tight, spring loaded contact with the corresponding rotor surface. In this latter case, the brush material may be continuous or segmented, depending on the degree of flexibility and contact surface desired.

The brush may be either permanently pressed against a flat annular contact surface on the end of the rotor or on a ring attached thereto or extending therefrom, or it may be pressed against such a surface repeatedly or/and selectively on command by actuation means. So that the electrical circuit is complete, at least two brushes are required, one each at opposing ends of a rotor or rotor face. Further, a conductor, such as a flexible shunt, may be provided to couple the brush ring to the load.

A variety of actuation means are suitable for moving the brush into contact with the contact surface, depending on the performance required. The brush mechanism of the present invention may be actuated, for example, by hydraulic or pneumatic cylinders. In this case, some provision is preferably made to prevent the ring from significantly rotating with respect to the stator. Suitable stabilization means include splines, keyways (slots or grooves), radial pins or tabs on the radially outward surface of the brush ring, which are made to slide within a stator configured with complementary grooves or protrusions. Another suitable actuation means comprises an annular bellows-type actuator, which can be integrated with the brush ring and which can serve as the conducting shunt as well. Of course, an alternate shunt can be provided if it is desirable to reduce or eliminate the current flowing through the bellows material.

An inflatable polymer diaphragm may also be used to actuate the brush mechanism. In this case, a separate shunt will be required, and it can be configured so that current flow will provide an additional force pressing the brush against the contact surface. This may be accomplished by shaping the shunt to direct the current in opposing directions.

Yet another suitable actuation means may be incorporated into the structure of the stator having windings (not shown) by allowing the rotor to move with respect to the stator to make contact with a stationary brush, or by moving a portion of the stator coupled to the brush hydraulically, pneumatically, mechanically, magnetically, or by other suitable means. In the first instance, the brush mechanism may be stationarily affixed to the stator, and the rotor may be adapted to move into position for contact with the brush. In the latter instance, leakage flux from the excitation field of the machine or motor may be used to attract a ferromagnetic portion of the brush ring, thus helping to ensure that brushes are actuated only when adequate excitation is present.

In some applications, it is possible that a single brush ring cannot carry the desired amount of current. Additionally, redundancy of brush collectors may be desired for other reasons. The present invention therefore contemplates embodiments having multiple brushes for drawing current from a single rotor. Any of the above-described mounting and actuation options may be used in multiple-brush embodiments. Furthermore, the planar brush and contact surface of the present invention may be combined with the previously known radial collection systems for redundancy or increased capacity.

The advantages of the present invention will be further appreciated from the drawings and from the detailed description provided below.

BRIEF DESCRIPTION OF THE DRAWINGS

The herein described advantages and features of the present invention, as well as others which will become apparent, are attained and can be understood in more detail by reference to the following description and appended drawings, which form a part of this specification.

It is to be noted, however, that the appended drawings illustrate only exemplary embodiments of the invention and are therefore not to be considered limiting of its scope, for the invention may admit to other equally effective embodiments.

DETAILED DESCRIPTION OF THE PREFERRED EMBODIMENTS

Figure 1:
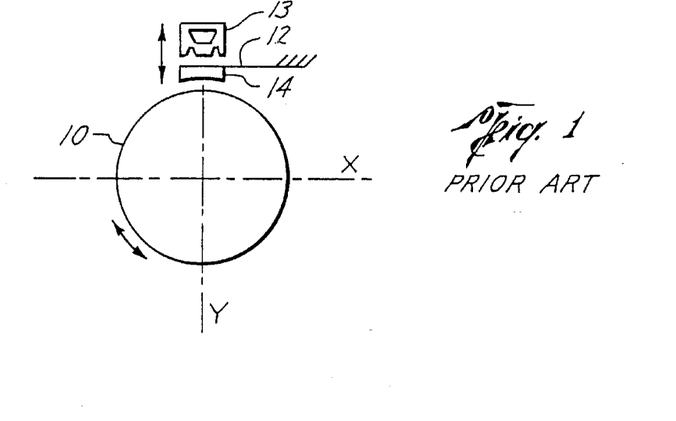
FIG. 1 is a simplified diagram of a rim-brush mechanism as is presently known in the art.

Turning now to the drawings, FIG. 1 is a simplified diagram of a known rim-brush mechanism 12 for locating rim brush 14 into contact with the rim of rotor 10 by way of actuating means 13. Because it contacts the curved rim of rotor 10, the contact surface of rim brush 14 must also be curved in a complementary fashion to achieve suitable contact area. However, current collection brushes wear during use, often unevenly; hence, the proper curve may not be maintained, making it increasingly difficult for the brush to contact the rotor rim efficiently.

Figure 2A:
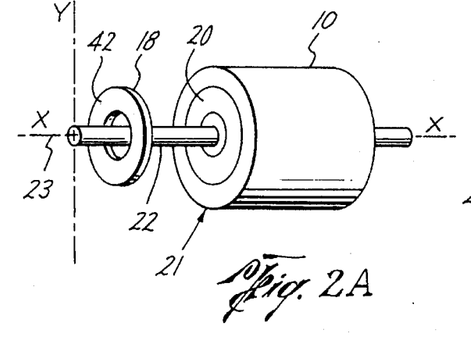
FIG. 2A is a simplified diagram of a face-brush mechanism according to the present invention.
Figure 2B:
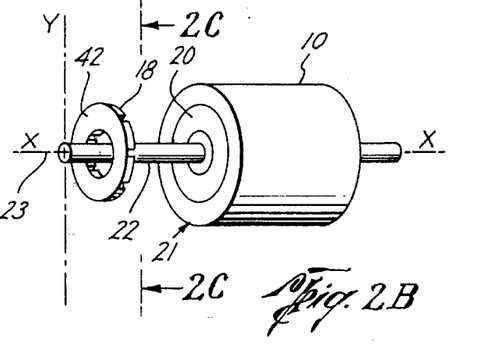
FIG. 2B is a simplified diagram of a segmented face-brush mechanism according to the present invention.
Figure 2C:
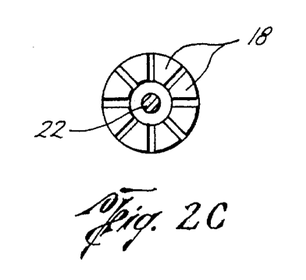
FIG. 2C is a cross-sectional view along plane 2C—2C of FIG. 2B.
Figure 4A:
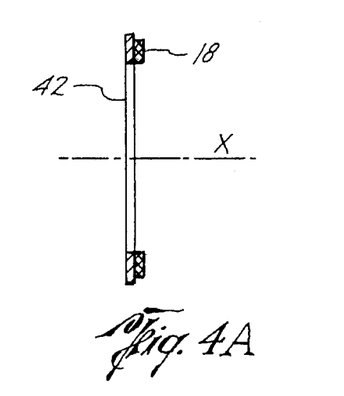
FIG. 4A is a cross section of a brush ring having brush material connected to a supporting ring according to the present invention.

The present invention provides an alternative brush design, as is illustrated in its most basic form in FIGS. 2A and 2B, for use in homopolar generators and other machines requiring sliding current transmission or collection mechanisms. The proposed design is a flat face brush ring 18 for contact with a flat contact surface 20 of a rotor 10. Annular contact surface 20 is preferably orthogonal to the rotational axis x (axis of rotation 23) of the rotor. Brush ring 18 may be a ring of brush material, centered around rotor shaft 22 and axis of rotation 23. Alternatively, brush ring 18 may comprise brush material (such as Morganite CM-1S) attached to a ring of supporting material 42, as illustrated in FIG. 4A, or it may comprise one or more discrete brushes, which are positioned to contact the contact surface 20 on end face 21 of rotor 10. In some installations, it may be desirable to segment the brush material on the brush ring into two or more segments, as shown in FIGS. 2B and 2C, for ease of installation and assembly. Actuation of brush ring 18 is along axis x, as illustrated in FIGS. 2A and 2B.

Two features of a brush system are particularly addressed by this invention. The first is the structure of the brush material and the brush ring. Because brush ring 18 contacts a flat contact surface 20, there is no curved contact surface, thereby reducing some of the difficulties that arise with rim brushes discussed earlier. The second brush-system feature addressed herein is the apparatus used to actuate the brush ring to bring it into contact with the flat contact surface.

Figure 3:
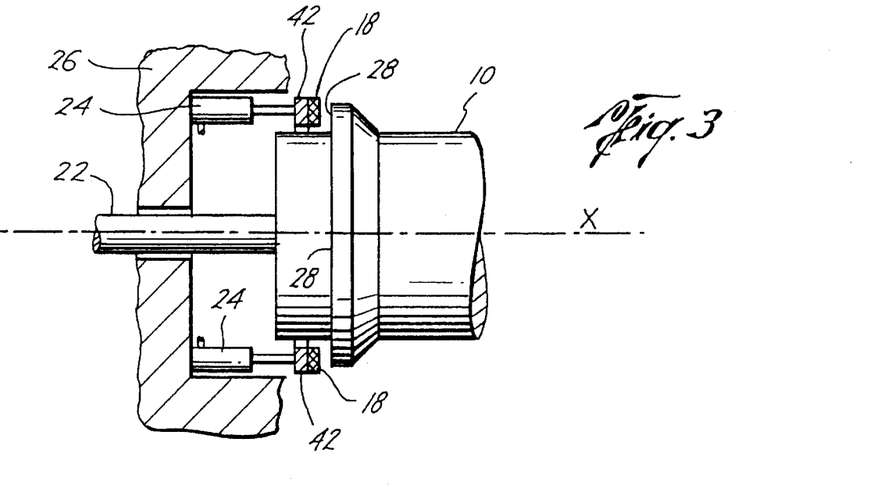
FIG. 3 is a partial cross section of a homopolar machine having discrete hydraulic or pneumatic cylinders used as brush actuation means.
Figure 3A:
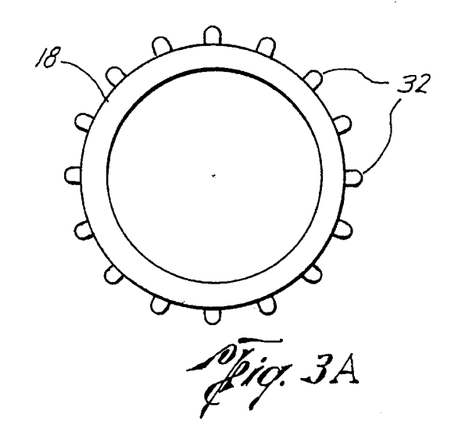
FIG. 3A is an end view of a brush ring with spline protrusions.
Figure 3B:
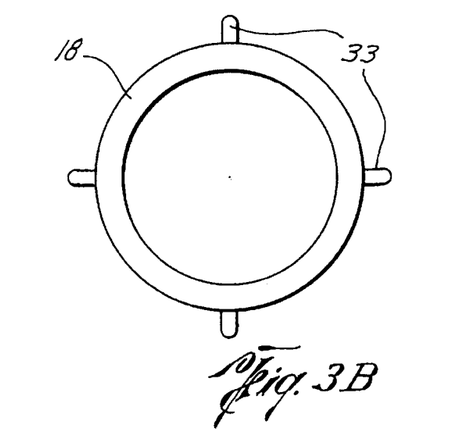
FIG. 3B is an end view of a brush ring with tab protrusions.
Figure 3C:
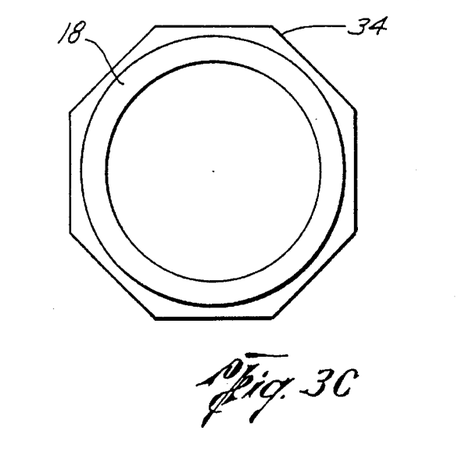
FIG. 3C is an end view of a brush ring having a polygonal circumference.
Figure 3D:
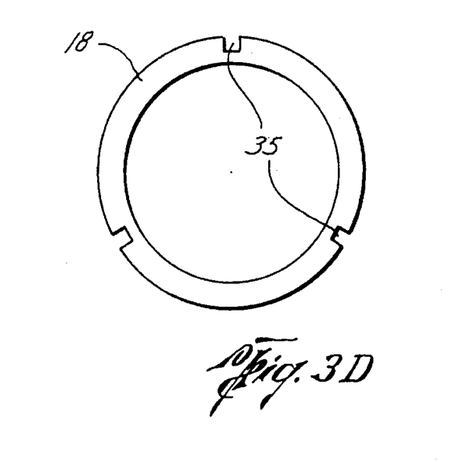
FIG. 3D is an end view of a brush ring having keyways or grooves in the radially outward surface.

A variety of actuation methods are possible according the present invention. For example, FIG. 3 illustrates the use of discrete hydraulic or pneumatic cylinders 24 for actuating brush ring 18, attached to support ring 42, into contact with flat contact surface 28 of rotor 10. FIG. 3 illustrates two cylinders 24 by way of example only; it will be apparent to those skilled in the art that a sufficient number of such cylinders 24 may be used to ensure adequately uniform contact of brush ring 18 with rotor contact surface 28.

In this case, some provision must be made to help prevent the brush ring 18 from rotating with respect to the stator and cylinders 24. Suitable stabilizing means include providing splines 32, pins or tabs 33, a polygonal exterior 34, or keyways (slots or grooves) 35 on the brush ring as shown in FIGS. 3A–3D, respectively. The stator may then have a corresponding structure in which the brush ring travels upon actuation i.e., the stator is shaped in complementary fashion with brush ring 18, such as having grooves to admit splines 32, pins or tabs 33, or having protruding elements to fit within slots 35, thus preventing rotation of the brush ring with respect to the stator.

Figure 4B:
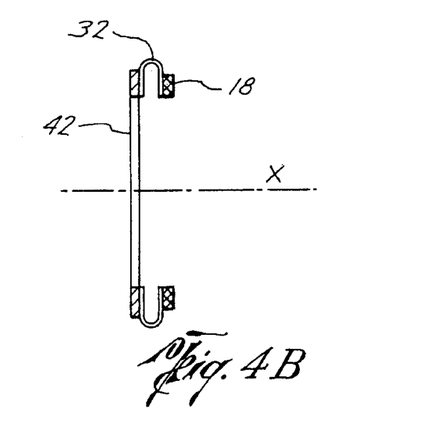
FIG. 4B is a cross section of a brush ring flexibly mounted to a metal ring by a flexible shunt according to the present invention.

A flexible conductive shunt 32, as shown in FIG. 4B, may be provided to conduct current from brush ring 18 to the stator (not shown), as well as to evenly apply force to press the brush material against the rotor face (not shown). Again, actuation is preferably primarily parallel to the x-axis.

Figure 5A:
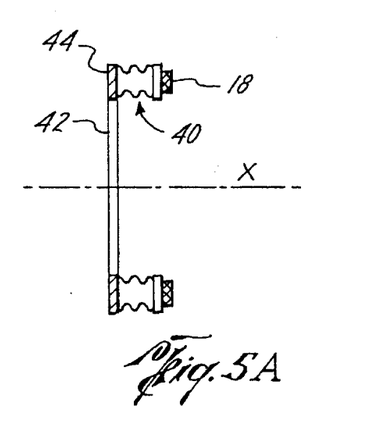
FIG. 5A is a cross section of a brush ring according to the present invention with annular metal bellows as actuation means.
Figure 5B:
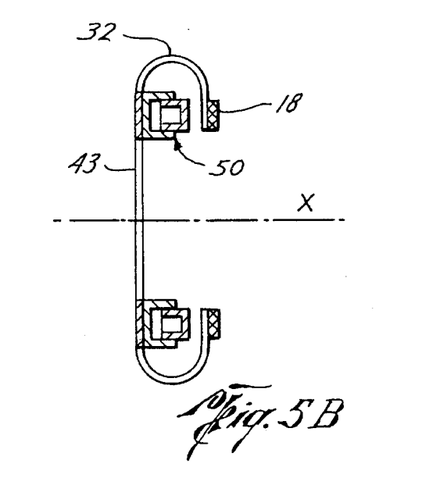
FIG. 5B is a cross section of a brush ring according to the present invention with inflatable polymeric diaphragms as actuation means.

Alternative means of actuation are illustrated in FIGS. 5A and 5B. FIG. 5A shows discrete or continuous annular metal bellows 40 between support ring 42 and brush ring 18 for actuating brush ring 18 into contact with a rotor (not shown). Support ring 42 may be mounted to a stator (not shown). Metal bellows 40 may be hydraulic, and filled with fluid through port 44 to expand the bellows, causing the brush to be actuated into contact with the contact surface on the rotor. Additionally, metal bellows 40 may form a single annular chamber, or a plurality of separate bellows 40 may be utilized in accordance with this invention.

FIG. 5B shows inflatable polymeric diaphragms 50 connected to mounting ring 43. When inflated with fluid (gas or liquid), diaphragms 50 actuate brush material 18, also mounted on mounting ring 43, into contact with a flat contact surface on a rotor (not shown). A separate shunt 32 is required if the diaphragm material is non-conductive or poorly conductive, and may be configured to direct the current in opposing directions, as shown in FIG. 5B, so that the current flow will provide an additional downward force.

Figure 6:
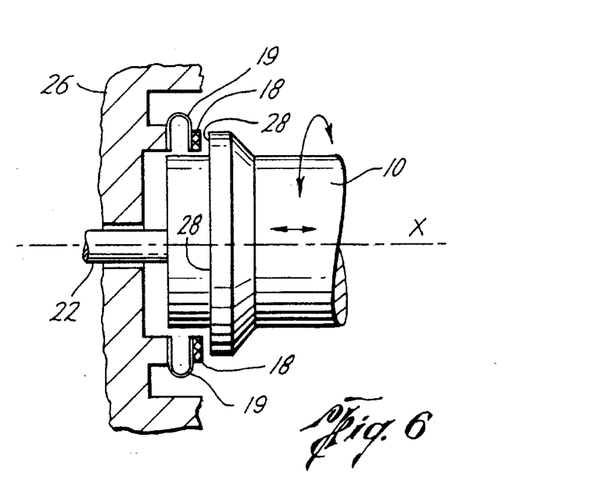
FIG. 6 is a partial cross section of a homopolar machine with a brush ring flexibly mounted to the stator.
Figure 7:
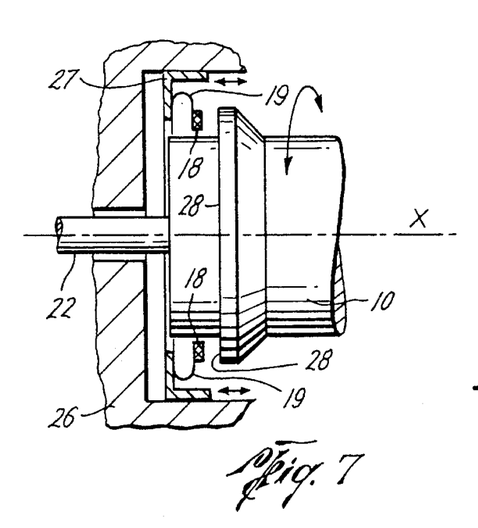
FIG. 7 is a partial cross section of a homopolar machine with a brush ring flexibly mounted to a moveable portion of the stator.

In another embodiment, the actuating mechanism may be incorporated into the stator, as illustrated in FIGS. 6 and 7. FIG. 6 shows a partial cross section of a homopolar machine with brush ring 18 flexibly mounted to stator 26 by means of flexible conductive shunt 19. Rotor 10 is moveable axially along shaft 22 (as indicated by the double arrow) so that flat rotor contact surface 28 may be placed into contact with brush ring 18.

FIG. 7 shows a partial cross section of a homopolar machine with brush ring 18 flexibly mounted by shunt 19 to a moveable portion 27 of stator 26. Actuation of moveable stator portion 27 will cause brush ring 18 to contact flat rotor contact surface 28 of rotor 10.

Figure 7A:
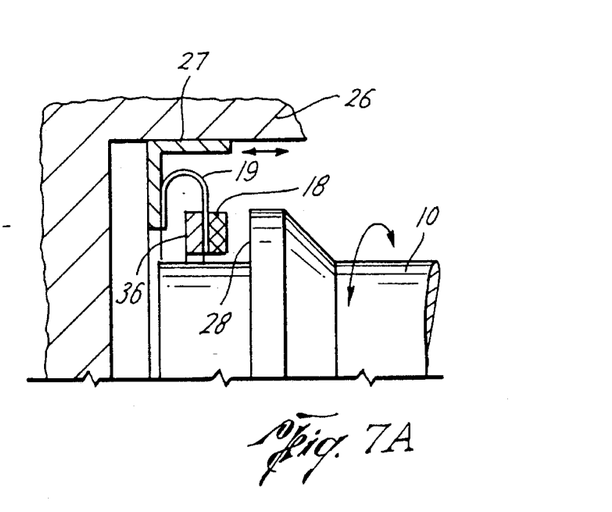
FIG. 7A is a partial cross section of a homopolar machine with a brush ring flexibly mounted to a moveable portion of the stator and having a ferromagnetic portion.

To ensure that the brush ring is actuated only when adequate excitation is present, the brush ring may have a ferromagnetic portion 36, as illustrated in FIG. 7A. In that case, leakage flux from the excitation field of the generator or motor may be used to attract the ferromagnetic portion of the brush ring, thus drawing the brush ring into contact with rotor 10 only when adequate excitation is present.

Figure 8A:
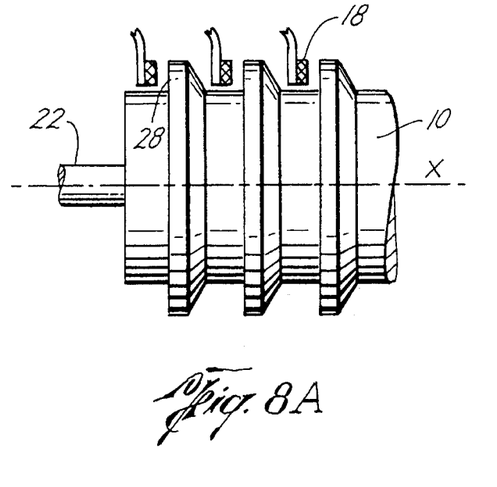
FIG. 8A is a diagram of a rotor having multiple faces for contact with multiple brush rings in accordance with the present invention.
Figure 8B:
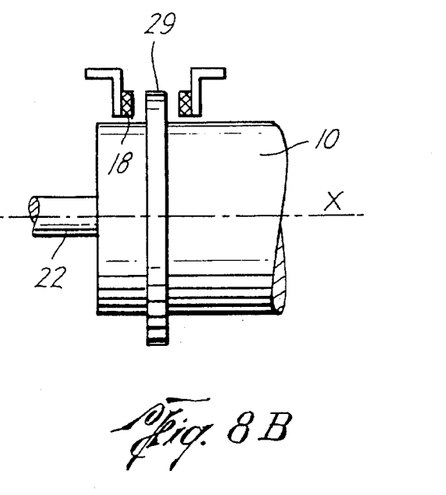
FIG. 8B is a diagram of a rotor having multiple opposing faces for contact with multiple brush rings in accordance with the present invention.

In the event that a single ring brush cannot carry the desired amount of current, or if redundancy of current collectors is desired for other reasons, multiple ring brushes can be utilized in parallel or in opposition, as illustrated in FIGS. 8A and 8B. Any of the mounting and actuating options described herein, or other suitable means, can be used in either case.

As illustrated in FIG. 8A, rotor 10 may have multiple extended rings, or lips 30, with flat contact surfaces 28 thereon that are orthogonal to the axis of rotation of the rotor. Upon actuation of the brushes, the desired number of brush rings 18 may be made to contact the corresponding surfaces 28. Alternatively, as shown in FIG. 8B, multiple brush rings 18 may be configured to contact a single rim 29 having opposing flat contact surfaces.

Figure 9:
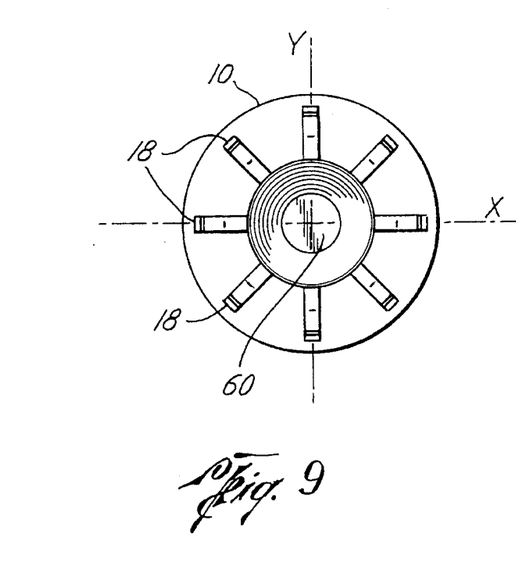
FIG. 9 is a diagram of a homopolar machine showing a brush ring coupled to an annular diaphragm spring.

Another suitable type of actuating means is diaphragm spring 60, shown in FIG. 9. The diaphragm spring is probably best known as a component in an automotive "diaphragm clutch." In that application, it is useful for "heavy" clutches that are difficult to actuate, as although it is difficult to push the clutch pedal in, once in it becomes easier to hold in. This is due to the "over center" action of the spring, illustrated in FIG. 9A.

Figure 9A:
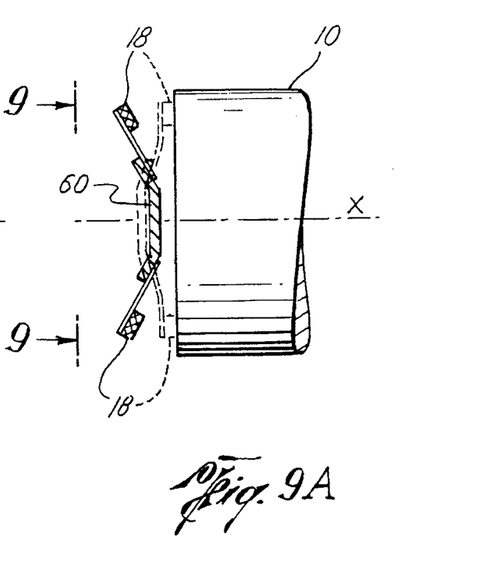
FIG. 9A is a side view of the annular diaphragm spring of FIG. 9 showing initial and inverted positions.

Operation of a diaphragm spring is typically as follows. The spring may be biased in one of two positions. A load applied to the spring will cause the spring to assume a stable inverted position, as shown in FIG. 9A. In other words, it will turn itself inside out. This position will be maintained until a load is applied in the opposite direction to bring the spring back to its initial position. Thus, the spring has two stable positions, similar to an on-off switch.

Such a diaphragm spring 60 may be used in accordance with the present invention to locate the brush ring(s) 18 radially, allowing the brush ring(s) to be actuated using any of the actuator mechanisms discussed herein wherein the actuator mechanism applies sufficient force to cause the spring to invert. The diaphragm spring can provide both the compliance necessary to accommodate rotor run out, and also serve as a shunt to conduct current from the brush ring(s) to the stator. Suitable diaphragm springs may be obtained from, for example, Metalcraft Manufacturing Corporation.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size, and arrangement of parts. For example, equivalent elements or materials may be substituted for those illustrated and described herein, and certain features of the invention may be utilized independently of the use of other features, all as would be apparent to one skilled in the art after having the benefit of this description of the invention.

What is claimed is:

1. An improvement in a homopolar machine, the machine including a stator and a rotor having a central axis of rotation, the improvement comprising:

a contact surface formed on the rotor, the contact surface being annular and planar with respect to the rotor, a plane of the contact surface being substantially orthogonal to the central axis; and a brush assembly comprising a brush member adapted to engage the contact surface to form an electrically conductive path between the rotor and the brush member, wherein the brush assembly further comprises an annular support ring encircling the central axis and movable parallel to the central axis, said annular support ring supporting said brush member.

2. The apparatus of claim 1, further comprising means for selectively actuating the brush member into contact with the contact surface.

3. The apparatus of claim 1, wherein the brush assembly further comprises a least one bellows coupled to the brush member, the bellows being axially expansible to actuate the brush member into contact with the contact surface.

4. The apparatus of claim 1, wherein the contact surface is formed on an axial end of the rotor.

5. The apparatus of claim 1, wherein the brush assembly is coupled to the stator, and wherein the rotor is movable axially with respect to the stator such that the contact surface engages the brush member when the rotor is moved toward the brush assembly.

6. An improvement in a homopolar machine, the machine having a stator and a rotor, and the rotor having a central axis of rotation, the improvement comprising:

a plurality of contact surfaces formed on the rotor, the contact surfaces being annular and planar with respect to the rotor, a plane of each of the contact surfaces being substantially orthogonal to the central axis; and a plurality of brush assemblies corresponding to the plurality of contact surfaces, each of said brush assemblies comprising a brush member adapted to selectively engage its corresponding contact surface to form an electrically conductive path between the rotor and the brush member.

7. An improvement in a homopolar machine, the machine having a stator and a rotor, and the rotor having a central axis of rotation, the improvement comprising:

a contact surface formed on the rotor, the contact surface being annular and planar with respect to the rotor, a plane of the contact surface being substantially orthogonal to the central axis;

a brush assembly, comprising an annular support ring encircling the central axis and selectively movable parallel to the central axis, and a brush member coupled to the annular support ring, the brush member adapted to slidably engage the contact surface to form an electrically conductive path between the rotor and the brush member; and means for selectively actuating the brush member into contact with the contact surface.

8. An improvement in a homopolar machine, the machine having a stator and a rotor, and the rotor having a central axis of rotation, the improvement comprising:

a plurality of contact surfaces formed on the rotor, the contact surfaces being annular and planar with respect to the rotor, a plane of the contact surfaces being substantially orthogonal to the central axis;

a plurality of brush members for conductively engaging the contact surfaces;

means for supporting the brush members; and means for selectively actuating the brush members into contact with the contact surfaces.

9. A method of collecting current from a homopolar machine for transmission to a load, comprising the steps of:

providing in the homopolar machine a rotor having an axis of rotation and a contact surface, the contact surface being annular and planar with respect to the rotor, a plane of the contact surface being substantially orthogonal to the rotor axis;

providing a brush assembly having a brush member adapted to conductively engage the contact surface;

selectively moving the brush assembly toward the rotor contact surface such that the brush member engages the contact surface; and collecting current from the rotor through the brush member for transmission to the load.

10. A homopolar machine, comprising:

a stator for producing a magnetic field;

a rotor rotatably disposed within said magnetic field to generate an electrical potential, said rotor having a substantially flat rotor brush-contact surface defined thereon which lies in a plane orthogonal to an axis of the rotor;

a brush for contacting said rotor brush-contact surface to collect current therefrom; and means for repeatedly and selectively actuating contact between the brush and the rotor brush-contact surface.

11. The machine of claim 10, wherein said brush is rigidly attached to the stator.

12. The machine of claim 10, wherein said brush comprises a segmented annular ring.

13. The machine of claim 10, wherein said contact actuating means comprises a piston/cylinder assembly associated with the stator and operable to move the brush.

14. The machine of claim 10, wherein said contact actuating means comprises an annular bellows associated with the stator and axially expansible to move the brush.

15. The machine of claim 10, wherein said contact actuating means comprises an inflatable polymeric diaphragm.

16. The machine of claim 10, further comprising an annular diaphragm spring coupled to said brush.

17. A brush mechanism for a homopolar machine having a rotor comprising a plurality of substantially flat rotor brush-contact surfaces defined thereon in planes substantially parallel to each other and orthogonal to an axis of the rotor, said rotor being rotational in a stator magnetic field to produce electrical discharge current, the brush mechanism comprising:

a brush for contacting each of said rotor brush-contact surfaces to conduct discharge current;

actuating means for repeatedly and selectively actuating contact between each brush and its said rotor brush-contact surfaces; and means for conducting current from each said brush to a stator.

18. The brush mechanism of claim 17, wherein said actuating means comprises a piston/cylinder assembly associated with the stator and operable to move the brush.

19. The brush mechanism of claim 17, wherein said actuating means comprises an annular bellows associated with the stator and axially expansible to move the brush.

20. The brush mechanism of claim 17, wherein said actuating means comprises an inflatable polymeric diaphragm.

21. The brush mechanism of claim 17, further comprising an annular diaphragm spring coupled to said brush.

22. A brush mechanism for a homopolar machine having a rotor comprising a substantially flat rotor brush-contact surface defined thereon in a plane orthogonal to the axis of the rotor, said rotor being rotational in a stator magnetic field to produce electrical discharge current, the brush mechanism comprising:

a brush for contacting said rotor brush-contact surface to conduct discharge current;

actuating means for repeatedly and selectively actuating contact between the brush and its said rotor brush-contact surface; and means for conducting current from said brush to a stator.

23. A contact system for a homopolar machine having a stator and a rotor rotational within the stator to produce electrical discharge current, said system comprising:

at least one ring integral with the rotor having a uniform width and extending in a uniform thickness circumferentially about said rotor, said ring also having opposing flat rotor-ring contact surfaces in planes orthogonal to art axis of rotation of said rotor;

a separate brush for contacting each said rotor-ring contact surface to conduct discharge current;

means for repeatedly and selectively actuating contact between each said brush and its said rotor-ring contact surface; and means for conducting current from each said brush to said stator.

24. An improvement in a homopolar machine, the machine including a stator and a rotor having a central axis of rotation, the improvement comprising:

a contact surface formed on the rotor, the contact surface being annular and planar with respect to the rotor, a plane of the contact surface being substantially orthogonal to the central axis;

a brush assembly comprising a brush member adapted to engage the contact surface to form an electrically conductive path between the rotor and the brush member; and means for selectively actuating the brush member into contact with the contact surface, wherein said actuating means comprises at least one hydraulic piston and cylinder disposed between the brush assembly and the stator.

25. The apparatus of claim 24, further comprising stabilizing means for inhibiting rotation of the brush assembly with respect to the stator when contact is made between the brush member and the contact surface.

26. An improvement in a homopolar machine, the machine including a stator and a rotor having a central axis of rotation, the improvement comprising:

a contact surface formed on the rotor, the contact surface being annular and planar with respect to the rotor, a plane of the contact surface being substantially orthogonal to the central axis;

a brush assembly comprising a brush member adapted to engage the contact surface to form an electrically conductive path between the rotor and the brush member; and means for selectively actuating the brush member into contact with the contact surface, wherein said actuating means comprises at least one pneumatic piston and cylinder disposed between the brush assembly and the stator.

27. The apparatus of claim 26, further comprising stabilizing means for inhibiting rotation of the brush assembly with respect to the stator when contact is made between the brush member and the contact surface.

28. An improvement in a homopolar machine, the machine including a stator and a rotor having a central axis of rotation, the improvement comprising:

a contact surface formed on the rotor, the contact surface being annular and planar with respect to the rotor, a plane of the contact surface being substantially orthogonal to the central axis;

a brush assembly comprising a brush member adapted to engage the contact surface to form an electrically conductive path between the rotor and the brush member; and means for selectively actuating the brush member into contact with the contact surface, wherein the brush assembly further comprises a least one bellows coupled to the brush member, the bellows being axially expansible to actuate the brush member into contact with the contact surface.

29. A homopolar machine, comprising:

a stator for producing a magnetic field;

a rotor rotatably disposed within said magnetic field to generate an electrical potential, said rotor having a substantially flat rotor brush-contact surface defined thereon which lies in a plane orthogonal to an axis of the rotor;

a brush comprising a continuous annular ring for contacting said rotor brush-contact surface to collect current therefrom; and means for repeatedly and selectively actuating contact between the brush and the rotor brush-contact surface.

30. A homopolar machine, comprising:

a stator for producing a magnetic field;

a rotor rotatably disposed within said magnetic field to generate an electrical potential, said rotor having a substantially flat rotor brush-contact surface defined thereon which lies in a plane orthogonal to an axis of the rotor;

a brush comprising a segmented annular ring for contacting said rotor brush-contact surface to collect current therefrom; and means for repeatedly and selectively actuating contact between the brush and the rotor brush-contact surface.

31. A homopolar machine, comprising:

a stator for producing a magnetic field;

a rotor rotatably disposed within said magnetic field to generate an electrical potential, said rotor having a substantially flat rotor brush-contact surface defined thereon which lies in a plane orthogonal to an axis of the rotor;

a brush comprising a piston/cylinder assembly associated with the stator and operable to move the brush for contacting said rotor brush-contact surface to collect current therefrom; and means for repeatedly and selectively actuating contact between the brush and the rotor brush-contact surface.

32. A homopolar machine, comprising:

a stator for producing a magnetic field;

a rotor rotatably disposed within said magnetic field to generate an electrical potential, said rotor having a substantially flat rotor brush-contact surface defined thereon which lies in a plane orthogonal to an axis of the rotor;

a brush comprising an annular bellows associated with the stator and axially expansible to move the brush for contacting said rotor brush-contact surface to collect current therefrom; and means for repeatedly and selectively actuating contact between the brush and the rotor brush-contact surface.

33. A homopolar machine, comprising:

a stator for producing a magnetic field;

a rotor rotatably disposed within said magnetic field to generate an electrical potential, said rotor having a substantially flat rotor brush-contact surface defined thereon which lies in a plane orthogonal to an axis of the rotor;

a brush comprising an inflatable polymeric diaphragm for contacting said rotor brush-contact surface to collect current therefrom; and means for repeatedly and selectively actuating contact between the brush and the rotor brush-contact surface.

34. A homopolar machine, comprising:

a stator for producing a magnetic field;

a rotor rotatably disposed within said magnetic field to generate an electrical potential, said rotor having a substantially flat rotor brush-contact surface defined thereon which lies in a plane orthogonal to an axis of the rotor;

a brush comprising an annular diaphragm spring coupled to said brush for contacting said rotor brush-contact surface to collect current therefrom; and means for repeatedly and selectively actuating contact between the brush and the rotor brush-contact surface.

35. A brush mechanism for a homopolar machine having a rotor comprising a plurality of substantially flat rotor brush-contact surfaces defined thereon in planes substantially parallel to each other and orthogonal to the axis of the rotor, said rotor being rotational in a stator magnetic field to produce electrical discharge current, the brush mechanism comprising:

a brush for contacting each of said rotor brush-contact surfaces to conduct discharge current;

actuating means for repeatedly and selectively actuating contact between each brush and its said rotor brush-contact surface; and means for conducting current from each said brush to a stator, said current conducting means comprising a compliant shunt interconnecting the brush and the stator.

36. The brush mechanism of claim 35, wherein said actuating means comprises a piston/cylinder assembly associated with the stator and operable to move the brush.

37. The brush mechanism of claim 35, wherein said actuating means comprises an annular bellows associated with the stator and axially expansible to move the brush.

38. The brush mechanism of claim 35, wherein said actuating means comprises an inflatable polymeric diaphragm.

39. The brush mechanism of claim 35, further comprising an annular diaphragm spring coupled to said brush.

* * * * *